(12) United States Patent
Feng et al.

(10) Patent No.: US 8,432,868 B2
(45) Date of Patent: Apr. 30, 2013

(54) SYSTEMS AND METHODS FOR SEAMLESSLY ROAMING BETWEEN A WIRELESS WIDE AREA NETWORK AND A WIRELESS LOCAL AREA NETWORK

(75) Inventors: Lei Feng, Shanghai (CN); Xiaoling Shao, Shanghai (CN); Jiawen Tu, Shanghai (CN); Yonggang Du, Shanghai (CN); Bo Liu, Shanghai (CN); Xiaohui Jin, Shanghai (CN); Jianbo Tian, Shanghai (CN); Xiaolu Sun, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 673 days.

(21) Appl. No.: 10/555,676

(22) PCT Filed: May 6, 2004

(86) PCT No.: PCT/IB2004/050612
§ 371 (c)(1),
(2), (4) Date: Oct. 18, 2006

(87) PCT Pub. No.: WO2004/100452
PCT Pub. Date: Nov. 18, 2004

(65) Prior Publication Data
US 2007/0270145 A1    Nov. 22, 2007

(30) Foreign Application Priority Data
May 9, 2003  (CN) .................................. 03 1 22389

(51) Int. Cl.
*H04W 4/00* (2009.01)
(52) U.S. Cl.
USPC ........... 370/331; 370/329; 370/330; 455/436; 455/437; 455/440

(58) Field of Classification Search ....... 455/426.1–453; 370/329–333
See application file for complete search history.

(56) References Cited

U.S. PATENT DOCUMENTS 5,511,072 A * 4/1996 Delprat .......................... 370/336
6,810,260 B1 * 10/2004 Morales ......................... 455/460
6,842,449 B2 * 1/2005 Hardjono ...................... 370/352

(Continued)

FOREIGN PATENT DOCUMENTS

| CN | 1411660 | 4/2003 |
| JP | 53050914 | 5/1978 |
| JP | 2004517574 | 6/2004 |
| WO | WO2004100452 | 11/2004 |

*Primary Examiner* — Lester Kincaid
*Assistant Examiner* — Mehmood B Khan
(74) *Attorney, Agent, or Firm* — Larry Liberchuk

(57) ABSTRACT

The present invention takes the advantage of the WLAN resources in hotspots for voice and data connections and enables seamless handover between WWAN and WLAN and vice versa. This allows two users in the hotspots to communicate with each other by making a voice over IP (VoIP) or video call, thus achieving cost savings for the end users and WWAN resources savings for the wireless operators. According to one embodiment of the invention, a mobile terminal has wireless wide area network (WWAN) and wireless local area network (WLAN) interfaces. The mobile terminal via a WWAN. If a WLAN is present, the mobile terminal sends a handover request together with its network address to the called mobile terminal, using a short message service (SMS) technique or a watermarking technique, for initiating a WLAN call with the called mobile terminal via a WLAN. After the WLAN call is established with the called mobile terminal, the mobile terminal releases the WWAN call.

28 Claims, 5 Drawing Sheets

U.S. PATENT DOCUMENTS

| | | | |
|---|---|---|---|
| 6,876,738 B1* | 4/2005 | Boland et al. | 379/221.01 |
| 6,985,732 B1* | 1/2006 | Ekman et al. | 455/436 |
| 2002/0085516 A1* | 7/2002 | Bridgelall | 370/329 |
| 2003/0046328 A1* | 3/2003 | Goo et al. | 709/200 |
| 2003/0125074 A1* | 7/2003 | Tanada et al. | 455/552 |
| 2003/0134636 A1* | 7/2003 | Sundar et al. | 455/432 |
| 2004/0209614 A1* | 10/2004 | Bright et al. | 455/426.1 |
| 2004/0233866 A1* | 11/2004 | Bossoli et al. | 370/328 |
| 2004/0264424 A1* | 12/2004 | Hirsbrunner et al. | 370/338 |
| 2006/0025141 A1* | 2/2006 | Marsh et al. | 455/445 |
| 2006/0142011 A1* | 6/2006 | Kallio | 455/445 |
| 2007/0270145 A1* | 11/2007 | Feng et al. | 455/436 |

* cited by examiner

SYSTEMS AND METHODS FOR SEAMLESSLY ROAMING BETWEEN A WIRELESS WIDE AREA NETWORK AND A WIRELESS LOCAL AREA NETWORK

BACKGROUND OF THE INVENTION

The invention relates generally to wireless communication technology, and more particularly to wireless communication systems having wireless wide area network (WWAN) and wireless local area network (WLAN) interfaces.

FIG. 1 illustrates typical service areas in which mobile terminals such as mobile phones are used. In these areas, the WWAN service area (e.g., GSM, GPRS, CDMA, 3G) may or may not overlap with a WLAN service area (as shown in FIG. 1). In the case where there is an overlap between the WWAN and WLAN service areas, both the WWAN and WLAN services are available. These overlapping areas are also referred to as hotspots, which include airports and hotels.

In hotspots (e.g., airports and hotels), people normally use mobile terminals for making voice calls and using low-speed data services via the WWAN and for using high-speed data services via the WLAN through an access point (AP). In situations in which two mobile terminals in the same hotspot or in different hotspots run by the same service provider are trying to communicate with each other, they still need to use the WWAN service to make voice calls. This is not cost effective even though a low cost alternative communication network, i.e., the WLAN, is available to both parties.

Therefore, there is a need to provide a cost effective method and system for seamlessly roaming between a WWAN and a WLAN in areas in which both services are available.

SUMMARY OF THE INVENTION

The present invention takes the advantage of the WLAN resources in hotspots for voice and data connections and enables seamless handover between WWAN and WLAN and vice versa. This allows two users in the hotspots to communicate with each other by making a voice over IP (VoIP) or video call, thus achieving cost savings for the end users and WWAN resources savings for the wireless operators.

According to one embodiment of the invention, there is provided a wireless communication system, e.g., a mobile terminal, having wireless wide area network (WWAN) and wireless local area network (WLAN) interfaces. The mobile terminal detects presence of a WWAN and a WLAN and establishes a WWAN call between this mobile terminal as a calling mobile terminal and a called mobile terminal via a WWAN. If the WLAN is present, the mobile terminal sends extra information including a handover request together with its network address (e.g., an IP address) to the called mobile terminal, using a short message service (SMS) technique or a watermarking technique, for initiating a WLAN call with the called mobile terminal via a WLAN. If a response received from the called mobile terminal indicates an acceptance of the handover request. The mobile terminal establishes the WLAN call with the called mobile terminal via the WLAN. Thereafter, the mobile terminal releases the WWAN call. However, if, during the WLAN call, the mobile terminal detects that it is moving away from the WLAN, the mobile terminal establishes a new WWAN call with the called mobile terminal via the WWAN.

In preferred embodiments of the invention, no modifications on the existing network infrastructure are required. Thus, the invention has no impact on current wireless network standards and can be easily deployed in the existing networks.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
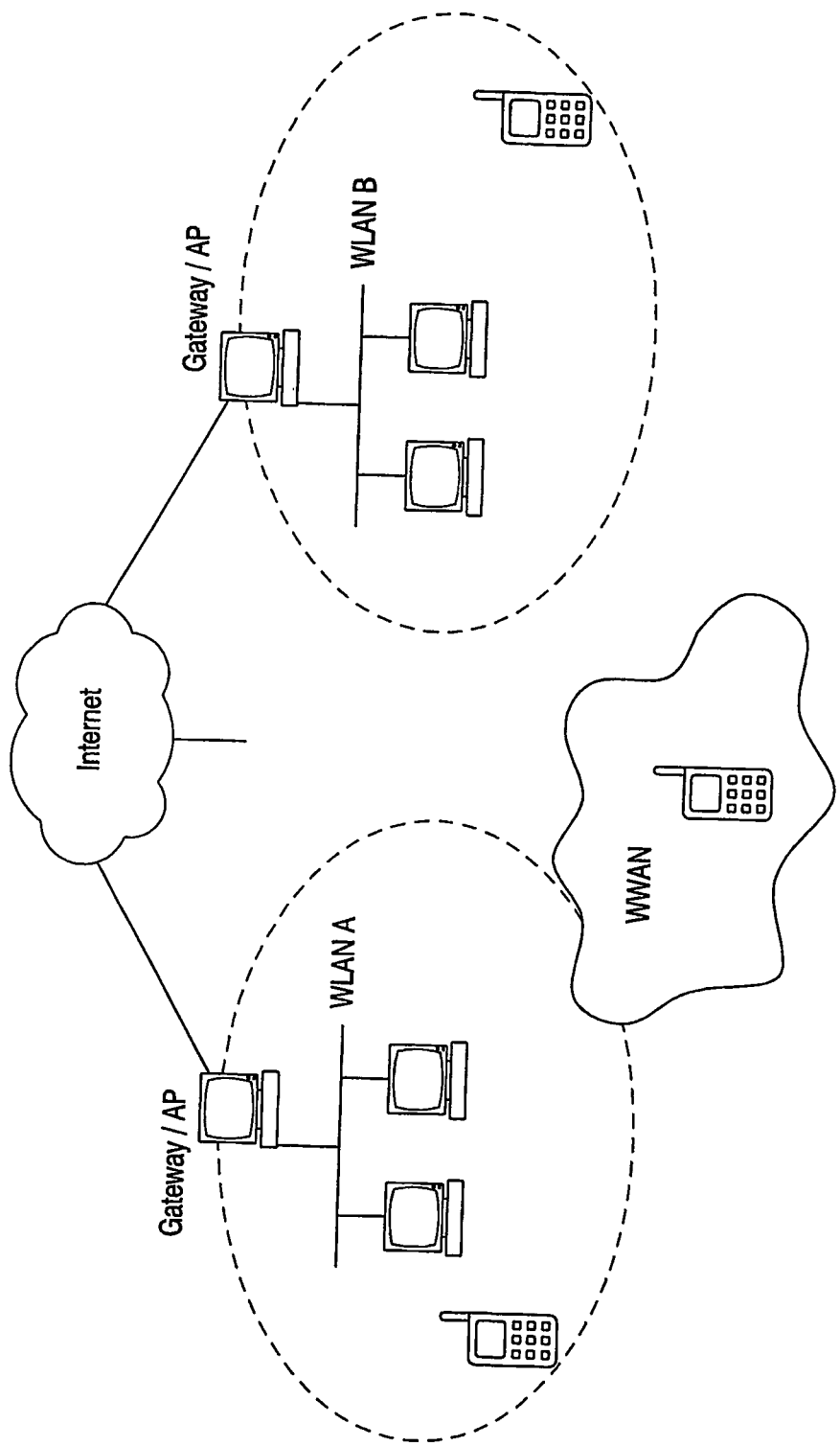
FIG. 1 illustrates typical service areas in which mobile terminals are used.
Figure 2:
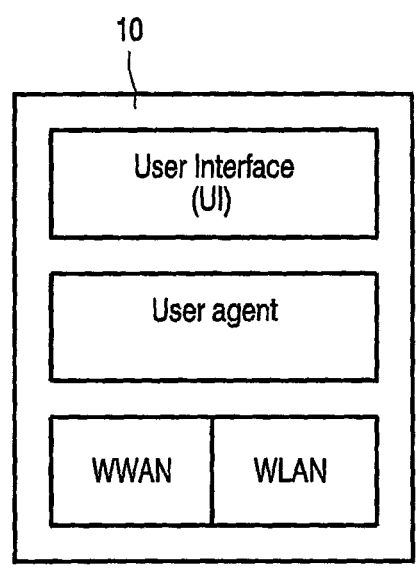
FIG. 2 shows a basic architecture of a mobile terminal with dual radio interfaces, according to one embodiment of the invention.

FIG. 2 shows a basic architecture of a mobile terminal 10 with dual radio interfaces—WWAN and WLAN interfaces—for use in the invention. When a user tries to make a call with mobile terminal 10, a user agent, which is responsible for profile management, service mediation, etc., will first make a WWAN call. After the call is set up, the user agent will determine which radio interface to use based on the user profile and the available radio interfaces. The user profile contains information about the radio interface preferences, handover permission during an active connection, etc. For example, if the user prefers a connection via the WLAN interface, the user agent will, after setting up the WWAN call, try to connect both parties via a WLAN. After the WLAN call (e.g., a voice or video call) is successfully set up, the WWAN call will be released without the user's direct involvement.

Figure 3:
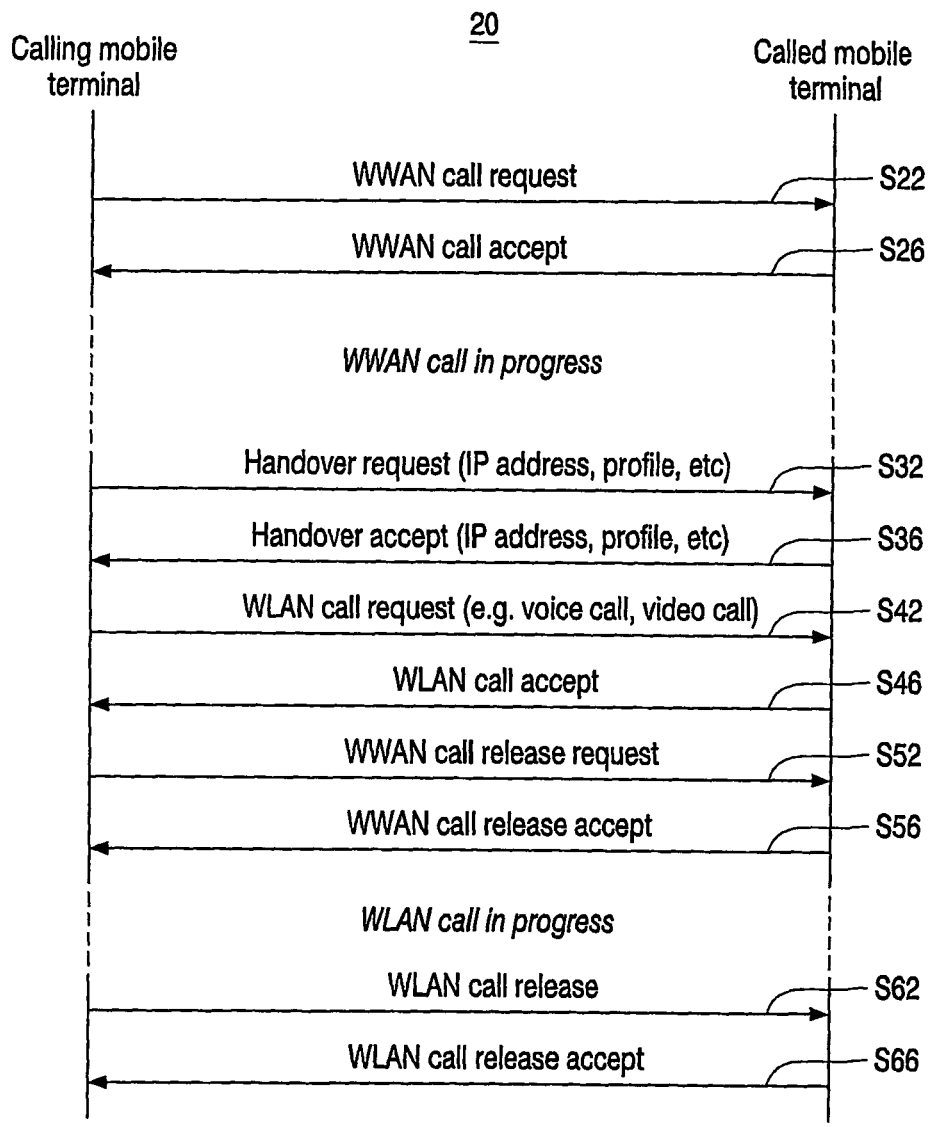
FIG. 3 illustrates a method for seamlessly roaming between a WWAN and a WLAN, according to one embodiment of the invention.

FIG. 3 illustrates a method 20 for seamlessly roaming between a WWAN and a WLAN, according to one embodiment of the invention. When a party enters into a hotspot, the user agent of this party's mobile terminal will detect the types of wireless services available. When the party tries to make a call, the user agent of this calling party's mobile terminal will make a call via a WWAN in a conventional way, using the MSISDN (Mobile Station International ISDN Number) of a called mobile terminal (steps S22 and S26). After the WWAN call is properly set up, the user agent of the calling mobile terminal will decide which radio interface to use based on the user profile of the calling party. If a WLAN is preferred, and the WLAN interface is available, the user agent will send extra information including a handover request together with information about the IP address, user profile, etc. of the calling mobile terminal to the called mobile terminal for handing over the call to the WLAN (step S32). The extra information is transferred using the short message service (SMS) or the watermarking technology. The watermarking technology allows the extra information to be hidden within the voice, as will be described later.

Upon receiving the handover request, the user agent of the called mobile terminal will decide whether to accept the request, based on its own user profile and the available radio interface of the called mobile terminal. If the called mobile terminal agrees to hand over the call to the WLAN, its user agent will send similar extra information including a handover accept response together with information about the IP address, user profile, etc. of the called mobile terminal to the calling mobile terminal, using the SMS or the watermarking technology (step S36). The calling mobile terminal will then initiate a call (e.g., a voice or video call) via a WLAN, using the received IP address of the called mobile terminal (steps S42 and S46). When the WLAN call has been successfully set up, the WWAN call will be released by both parties (steps S52 and S56). After the WLAN call is completed, it will also be released by both parties (steps S62 and S66).

In the above, during an active WLAN call, one of the parties may leave a WLAN service area. In such case, the user agent of this party's mobile terminal will recognize a change in the radio signals. If the calling party is leaving the area, the user agent of the calling mobile terminal will try to initiate a new WWAN call to the called mobile terminal. On the other hand, if the called party is leaving the area, the user agent of the called mobile terminal will send a handover request via the WLAN to the calling mobile terminal to initiate a new WWAN call. This new WWAN call will be automatically accepted by the called mobile terminal. After the new WWAN call is successfully set up, the WLAN call will be immediately released by both parties. Optionally, the called mobile terminal may also initiate the new WWAN call to the calling mobile terminal when the called party is leaving the area.

In the above, the handovers from a WWAN to a WLAN and vice versa are transparent to both users, so that the call between them is not affected. Also, the parties may communicate with each other via the Internet connecting two WLANs, within each of which one party is present.

The watermarking technology as used in the invention will now be described. By using this technology, the extra information (i.e., the handover request, IP address, user profile, etc.) is exchanged along with the voice in one channel, e.g., the voice channel between two mobile terminals. Such exchanges will not affect the normal voice conversation, since during a typical telephone conversation, 50% of the time is used for listening and 10% of the time is used for pausing between words and sentences. Therefore, there are sufficient resources for exchanging the extra information, without requiring modifications to the existing network infrastructure. The extra information may be added by the user agent in a mobile terminal as either analog signals or digital signals.

Figure 4:
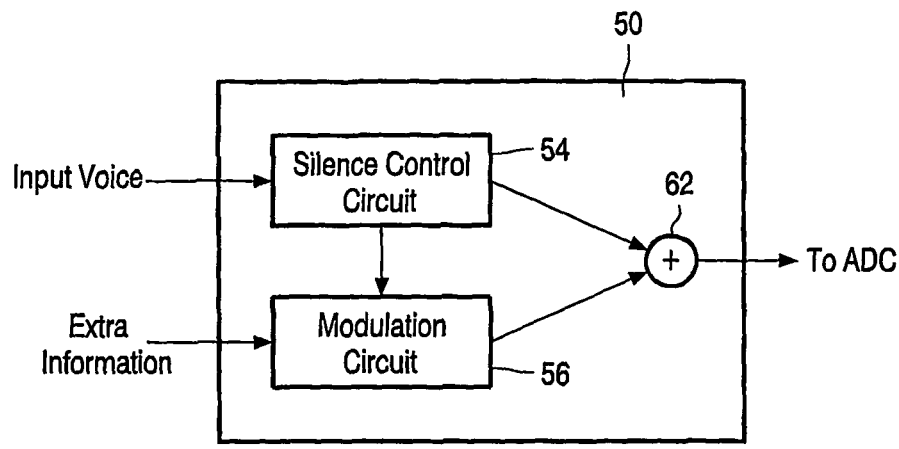
FIG. 4 shows a circuit for adding extra information as analog signals in a calling mobile terminal, in accordance with one embodiment of the invention.

FIG. 4 shows a circuit 50 for adding the extra information (i.e., the handover request, IP address, user's profile, etc.) in the voice channel of a calling mobile terminal, in accordance with one embodiment of the invention. Circuit 50 includes a silence control circuit 54, a modulation circuit 56, and a time division multiplexer 62. The user agent of the calling mobile terminal provides the extra information in the form of a digital sequence to modulation circuit 56 for modulation into analog signals. When silence control circuit 54 detects a silence in the input voice, it sends a control signal to modulation circuit 56. Upon receiving the control signal, modulation circuit 56 outputs the extra information in an analog form to multiplexer 62. Multiplexer 62 time multiplexes the voice output with the extra information and sends a combined output to an ADC for transmitting to a called mobile terminal in a voice channel.

The extra information can be modulated as some patterns of frequencies in the voice band (0~4000 Hz). For example, the Dual Tone Multi Frequency (DTMF) technique may be used to transfer 16 digits (0~9, A~F). Frequencies that last certain time durations (e.g., 5 ms) stand for a symbol. As an example, the combined frequencies of 1336 Hz and 770 Hz stand for 6, and the combined frequencies of 1477 Hz and 852 Hz stand for 8. If a party wants to transmit "68", the frequencies to be added into the voice will be |1336 Hz+700 Hz| simultaneously for 5 ms and |1477 Hz+852 Hz| simultaneously for 5 ms.

Figure 5:
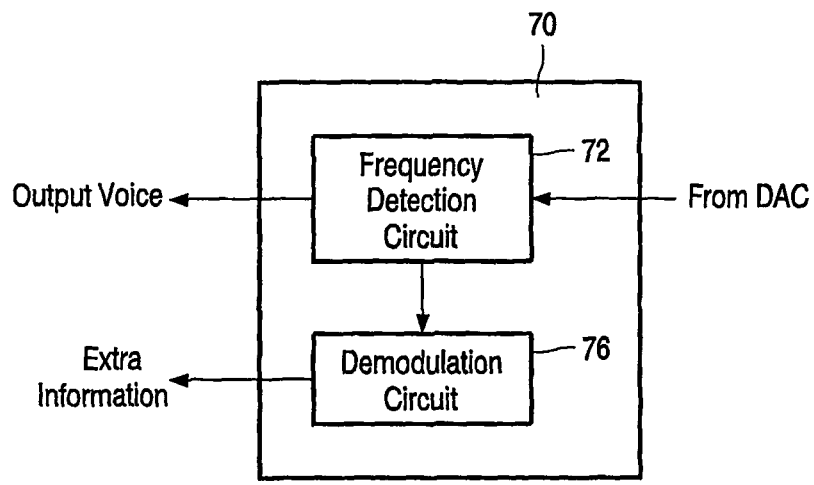
FIG. 5 shows a circuit for demodulating the extra information added as analog signals in a called mobile terminal, in accordance with one embodiment of the invention.

FIG. 5 shows a circuit 70 for demodulating the extra information received by a called mobile terminal in the voice channel, in accordance with one embodiment of the invention. Frequency detection circuit 70 includes a frequency detection circuit 72 and a demodulation circuit 76. Frequency detection circuit 72 receives combined analog signals from a digital-to-analog converter (DAC), including both the voice and the extra information. Circuit 72 recognizes the frequencies used for representing symbols, and outputs the recognized frequencies to demodulation circuit 76 for decoding the pre-defined frequency patterns to extract the extra information. For example, if the frequency patterns |1336 Hz+700 Hz| and |477 Hz+852 Hz| described above are recognized by frequency detection circuit 72 and output to demodulation circuit 76, demodulation circuit 76 will decode the frequency patterns and output a digital sequence of "68".

To reduce decoding errors, the maximum time duration for the same frequency pattern is defined. For example, the same frequency that lasts longer than 50 ms is not allowed. If a calling mobile terminal sends more than 10 identical digits within a time duration over 50 ms (i.e., 10×5 ms), a disturbance frequency pattern (e.g., |1888 Hz+888 Hz|) will be added after the 10th digit. The called mobile terminal can locate the disturbance frequency pattern after the 10 identical digits. For instance, when the calling mobile terminal sends a digital sequence of 999,999,999,999 to the called mobile terminal, it will be received as 9,999,999,999,x99, where x represents a disturbance frequency pattern.

Figure 6:
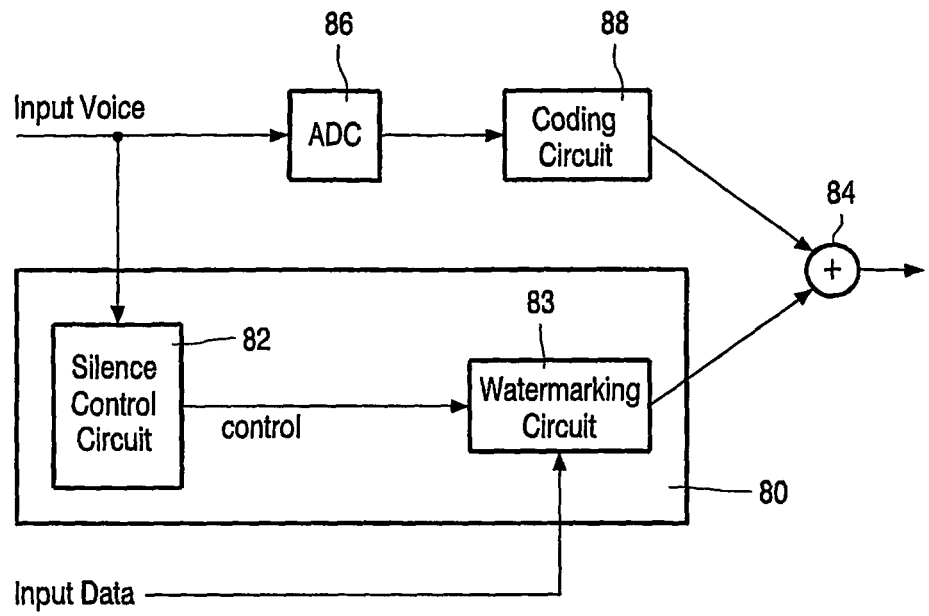
FIG. 6 shows a circuit for adding the extra information as digital signals in a calling mobile terminal, in accordance with one embodiment of the invention.

FIG. 6 shows a circuit 80 for adding the extra information as digital signals in a calling mobile terminal in accordance with one embodiment of the invention. Circuit 80 includes a silence control circuit 82 and a watermarking circuit 83. Silence control circuit 82 detects silent periods in the input voice and upon detecting a silent period, provides a control signal to watermarking circuit 83. Watermarking circuit 83 receives the input data, including the IP address, user profile, etc. from the user agent and upon receiving the control signal, outputs the data to a time multiplexer 84. Watermarking circuit 83 may be implemented with a latch circuit. An ADC 86 converts the input voice into digital signals and provides the digital signals to a coding circuit 88 for coding to comply with a specific communication standard (e.g., GSM). The output from coding circuit 88 and the data from watermarking circuit 83 will be time multiplexed by multiplexer 84 to provide a combined output for baseband processing. In this way, the extra information is inserted in the silent periods of the input voice.

Figure 7:
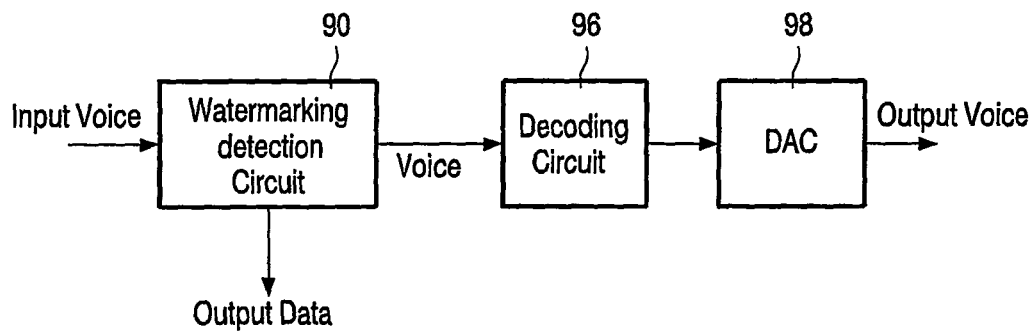
FIG. 7 shows a circuit for extracting the extra information inserted as digital signals in a called mobile terminal, in accordance with one embodiment of the invention.

FIG. 7 shows a watermarking detection circuit 90 for extracting the extra information inserted as digital signals, in a called mobile terminal in accordance with one embodiment of the invention. Watermarking detection circuit 90 detects a pair of pre-defined digital sequences (described below in detail) from the input voice to recover the data as the extra information. The voice will be allowed to pass through watermarking detection circuit 90 and will be output to a decoding circuit 96, which decodes the voice in accordance with a specific communication standard. A digital-to-analog (DAC) 98 converts the decoded voice into analog signals and provides them to an output device.

In FIGS. 6 and 7, a pre-defined digital sequence is used for marking the start point and end point of the extra information. For example, a digital sequence 1010101010101010 may be used for marking the start and end of the extra information. All the extra information must be enclosed within a pair of two such sequences. If the extra information or the input voice contains the same sequence pattern as the start or the end sequence, then this sequence pattern must be transformed. For example, if the extra information contains 1010101010101010, this sequence will be changed to 101010101010101110, with "11" being inserted in between the last two bits.

In the above, the invention has been illustrated in conjunction with a WWAN and WLAN. However, the invention may be used for roaming between any two wireless communication networks.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method performed by a mobile terminal having wireless wide area network (WWAN) and wireless local area network (WLAN) interfaces, the method comprising:
    (a) detecting presence of a WWAN and a WLAN;
    (b) establishing a WWAN call between the mobile terminal as a calling mobile terminal and a called mobile terminal via a WWAN;
    (c) sending extra information including a handover request together with a network address of the calling mobile terminal to the called mobile terminal, for initiating a WLAN call with the called mobile terminal via a WLAN, when the WLAN is present;
    (d) receiving a response from the called mobile terminal; and
    (e) when the response indicates an acceptance of the handover request, establishing the WLAN call with the called mobile terminal via the WLAN.

2. The method of claim 1, further comprising, after (e), releasing the WWAN call.

3. The method of claim 1, further comprising:
    during the WLAN call, detecting whether the calling mobile terminal is moving away from the WLAN; and
    when the calling mobile terminal is moving away from the WLAN, establishing a new WWAN call with the called mobile terminal via the WWAN.

4. The method of claim 1, further comprising:
    detecting a preferred radio interface for communication based on a user profile in the calling mobile terminal;
    wherein (c) is performed when the preferred radio interface is the WLAN interface and the WLAN is present.

5. The method of claim 1, further comprising:
    accepting a WLAN call connection with another mobile terminal via a WLAN, as a receiving mobile terminal;
    during the WLAN call, detecting whether the receiving mobile terminal is moving away from the WLAN; and
    when the receiving mobile terminal is moving away from the WLAN, sending a handover request to the other mobile terminal for initiating a new WWAN call with the other mobile terminal via a WWAN.

6. A method performed by a calling mobile terminal having dual radio interfaces respectively for first and second wireless communication networks, the method comprising:
    (a) detecting presence of the first and second wireless communication networks;
    (b) establishing a first call between the mobile terminal as a calling mobile terminal and a called mobile terminal via a first wireless communication network;
    (c) sending extra information including a handover request together with a network address of the calling mobile terminal in the second wireless communication network to the called mobile terminal for initiating a second call with the called mobile terminal via the second wireless communication network, when the second wireless communication network is present;
    (d) receiving a response from the called mobile terminal; and
    (e) when the response indicates an acceptance of the handover request, establishing the second call with the called mobile terminal via the second wireless communication network.

7. The method of claim 6, further comprising, after (e), releasing the first call.

8. The method of claim 6, further comprising:
    during the second call, detecting whether the calling mobile terminal is moving away from the second wireless communication network; and
    when the calling mobile terminal is moving away from the second wireless communication network, establishing a third call with the called mobile terminal via the first wireless communication network.

9. The method of claim 6, further comprising:
    detecting a preferred radio interface for communication based on a user profile in the calling mobile terminal;
    wherein (c) is performed when the preferred radio interface is for the second wireless communication network and the second wireless communication network is present.

10. The method of claim 6, further comprising:
    accepting a fourth call connection with another mobile terminal via the second wireless communication network, as a receiving mobile terminal;
    during the fourth call, detecting whether the receiving mobile terminal is moving away from the second wireless communication network; and
    when the receiving mobile terminal is moving away from the second wireless communication network, sending a handover request to the other mobile terminal for initiating a fifth call with the other mobile terminal via the first wireless communication network.

11. The method of claim 1, wherein the extra information is sent to the called mobile terminal using a short message service (SMS) technique.

12. The method of claim 1, wherein the extra information is sent to the called mobile terminal using a watermarking technique.

13. The method of claim 12, wherein the extra information is sent to the called mobile terminal via a voice channel between the calling and called mobile terminals.

14. The method of claim 13, wherein the extra information is inserted in the silent durations of input voice.

15. The method of claim 11, wherein the network address is an Internet Protocol (IP) address.

16. A mobile terminal having wireless wide area network (WWAN) and wireless local area network (WLAN) interfaces, comprising:

a user agent module for detecting presence of a WWAN and a WLAN;

the user agent module establishing a WWAN call between the mobile terminal as a calling mobile terminal and a called mobile terminal via a WWAN;

the user agent module sending extra information including a handover request together with a network address of the calling mobile terminal to the called mobile terminal, for initiating a WLAN call with the called mobile terminal via a WLAN, when the WLAN is present;

the user agent module receiving a response from the called mobile terminal; and the user agent module establishing the WLAN call with the called mobile terminal via the WLAN when the response indicates an acceptance of the handover request.

17. The terminal of claim 16, wherein the user agent module releases the WWAN call after the WLAN call is established.

18. The terminal of claim 16, further comprising:
the user agent module detecting, during the WLAN call, whether the calling mobile terminal is moving away from the WLAN;
wherein the user agent module establishes a new WWAN call with the called mobile terminal via the WWAN, when the calling mobile terminal is moving away from the WLAN.

19. The terminal of claim 16, further comprising:
the user agent module detecting a preferred radio interface for communication based on a user profile in the calling mobile terminal;
wherein the user agent module sends the extra information, when the preferred radio interface is the WLAN interface and the WLAN is present.

20. The terminal of claim 16, further comprising:
the user agent module accepting a WLAN call connection with another mobile terminal via a WLAN, as a receiving mobile terminal;
the user agent module detecting, during the WLAN call, whether the receiving mobile terminal is moving away from the WLAN; and
the user agent module sending a handover request to the other mobile terminal for initiating a new WWAN call with the other mobile terminal via a WWAN, the user agent module of the receiving mobile terminal sending the handover request when the receiving mobile terminal is moving away from the WLAN.

21. The terminal of claim 16, wherein the extra information is sent to the called mobile terminal using a short message service (SMS) technique.

22. The terminal of claim 16, wherein the extra information is sent to the called mobile terminal using a watermarking technique.

23. The terminal of claim 22, wherein the extra information is sent to the called mobile terminal via a voice channel between the calling and called mobile terminals.

24. The terminal of claim 22, wherein the user agent module includes:
a silence control circuit that receives input voice and detects silent periods in the input voice, the control circuit outputting a control signal upon detecting a silent period;
a modulation circuit that modulates the extra information into modulated analog signals and is responsive to the control signal, the modulation circuit outputting the modulated analog signals upon receiving the control signal; and
a time division multiplexer that multiplexes the modulated analog signals into the silent periods of the input voice.

25. The terminal of claim 22, wherein the user agent module includes:
a silence control circuit that receives input voice and detects silent periods in the input voice, the control circuit outputting a control signal upon detecting a silent period;
a watermarking circuit that receives the extra information and is responsive to the control signal, the watermarking circuit outputting the extra information upon receiving the control signal; and
a time division multiplexer that multiplexes the extra information into the silent periods of digitized input voice.

26. The terminal of claim 20, wherein the user agent module includes:
a frequency detection circuit that detects pre-defined frequency patterns representing digital symbols from received voice data; and
a demodulation circuit that demodulates the frequency patterns to output a corresponding digital sequence as the extra information.

27. The terminal of claim 20, wherein the user agent module includes a watermarking detection circuit that detects a pair of pre-defined digital sequences to recover a digital sequence enclosed by the pair as the extra information.

28. The terminal of claim 21, wherein the network address is an Internet Protocol (IP) address.

* * * * *